(12) United States Patent
Brown et al.

(10) Patent No.: US 6,234,305 B1
(45) Date of Patent: May 22, 2001

(54) GEOMETRIC BELT SPLICING

(75) Inventors: Houston Channing Brown, West Mansfield; Pedro Emilio Rengifo, Marysville, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/358,583

(22) Filed: Jul. 21, 1999

(51) Int. Cl.[7] .............................. B65G 17/00; B65G 15/34
(52) U.S. Cl. ........................................ 198/844.2; 198/847
(58) Field of Search .................................... 198/846, 847, 198/844.2; 24/31 B, 38; 474/253

(56) References Cited

U.S. PATENT DOCUMENTS

| | | | |
|---|---|---|---|
| 2,391,731 | 12/1945 | Miller et al. | 51/188 |
| 2,506,915 | 5/1950 | Bishop | 154/46 |
| 2,681,486 | 6/1954 | Carter | 24/38 |
| 2,794,726 | 6/1957 | Riedesel et al. | 51/297 |
| 2,932,340 * | 4/1960 | Poeschl | 24/38 |
| 3,693,218 * | 9/1972 | Jaubert et al. | 198/193 X |
| 4,216,856 * | 8/1980 | Moring et al. | 198/847 X |
| 4,235,120 | 11/1980 | Candle | 475/254 |
| 4,279,676 | 7/1981 | Morrison et al. | 156/159 |
| 4,737,138 * | 4/1988 | Komai et al. | 474/266 X |
| 5,244,083 * | 9/1993 | Arnold | 198/844.2 X |
| 5,275,858 | 1/1994 | Hock | 428/58 |
| 5,377,818 | 1/1995 | White | 198/844.2 |
| 5,531,316 | 7/1996 | Savino | 198/844.2 |
| 5,697,491 * | 12/1997 | Alex | 198/846 X |
| 5,773,114 | 6/1998 | Adams | 428/57 |

\* cited by examiner

Primary Examiner—Christopher P. Ellis
Assistant Examiner—Gene O. Crawford
(74) Attorney, Agent, or Firm—Nancy T. Krawczyk

(57) ABSTRACT

An improved method of splicing a belt, and preparing a belt end to be spliced, is disclosed. The ends of the multiple reinforcing layers of the belt are prepared along spaced transverse edges in defined different geometric configurations. At a minimum, the ends of the reinforcing layers are prepared with at least two different geometric configurations.

9 Claims, 5 Drawing Sheets

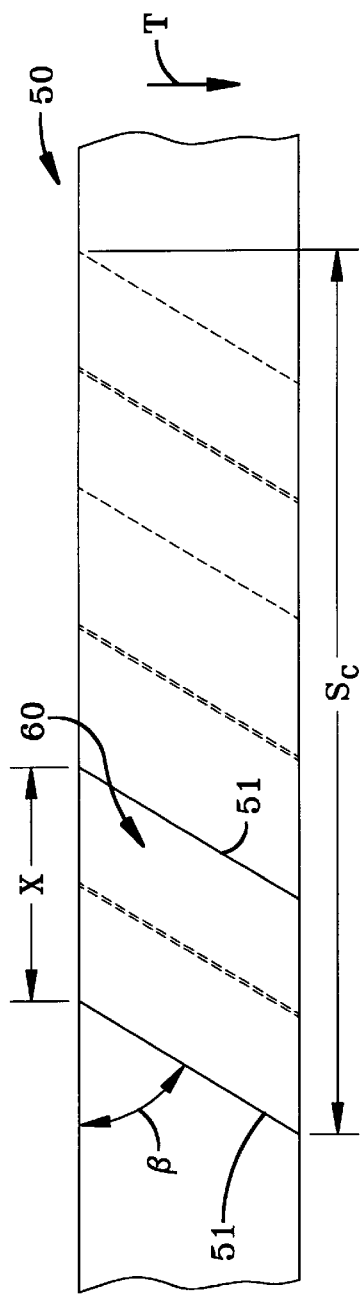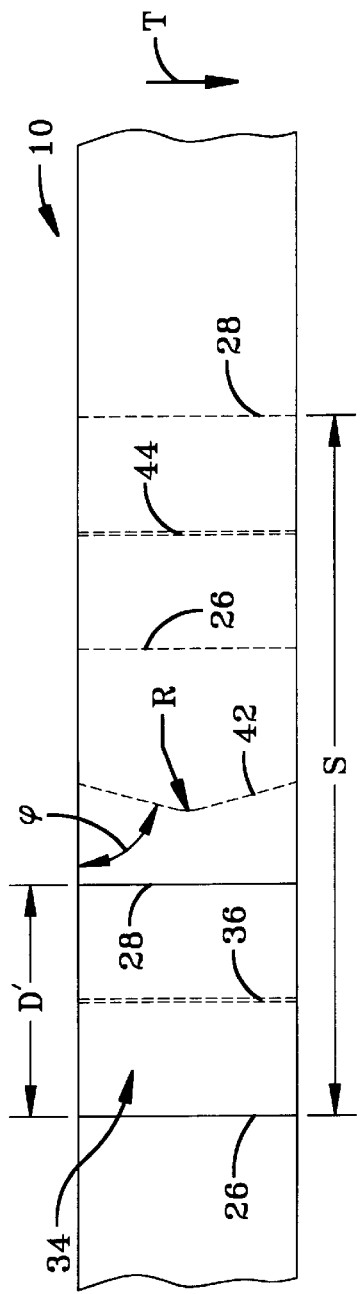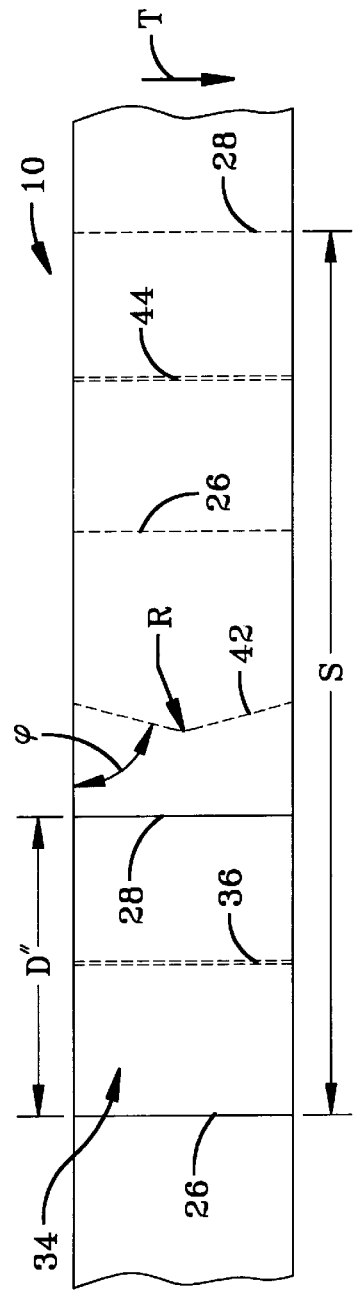
FIG-4A PRIOR ART
FIG-4B
FIG-4C

GEOMETRIC BELT SPLICING

FIELD OF THE INVENTION

The present invention is directed toward a splicing method. More particularly, the present invention is directed toward a method of preparing a belt for splicing using a combination of geometric configurations.

BACKGROUND OF THE INVENTION

Conveyor belting is typically formed from at least one reinforcing layer, a top cover and a bottom cover. The number of reinforcing layers varies depending upon the desired end use of the belting and the required strength characteristics. Belting length also varies due to the end use; for example, mining operations use belting with lengths measured in thousands of feet, while manufacturing operations may use belting with lengths of only several hundred feet. Whatever the ultimate end use, generally at some point the belting will need to be spliced, either in forming the endless belting from at least one belting section or when making repairs by removing a section of damaged or unserviceable belting.

Currently, vulcanizing splices are made at a bias or arch, with or without fingers at the joints of the splice. See e.g. U.S. Pat. Nos. 4,235,120; 4,279,676; 5,275,858; 5,377,818, 5,531,316, and 5,773,114. The outside joints may or may not be protected with breakers. Such a typical vulcanized splice is illustrated in FIGS. 3 and 4A. Illustrated is a three-ply conveyor belting 50. The ends 51 of the top cover 52 are spaced from each other and are cut at inclined, bias angles $\alpha$, $\beta$ with respect to both the longitudinal L and transverse T direction of the belt 50. The bottom, or pulley cover, layer 53 is prepared in an identical manner. The splices between the reinforcement layers 54, 55, 56, and the adjacent elastomeric layers, 57, 58 are spaced between the top and bottom cover layer splices. All of the splices are also cut at a bias angle $\beta$ relative to the transverse T direction of the belt. The edges of the reinforcement and elastomeric layers may be provided with fingers for interlocking the edges of the layers. Because all of the layers are spliced along a bias angle, the length of the splice $S_C$ is dependent upon the number of reinforcing layers and the splice inclination angle $\beta$. The conventional spliced conveyor belting 50 is provided with breaker layers 59 to reinforce the splice and cover layers 60.

While the conventional method of belt splicing has proved adequate, there is still a loss of static strength in the belting at the splice location. Additionally, due to the inclination angles required of the conventional splicing, splicing of the belting can be time consuming, reducing operational time for the belting, and slowing down production whenever repair splicing is required. The present invention is directed toward overcoming these known drawbacks of the current splicing methods.

The inventive disclosed method of splicing multiple layers of belting improves the life performance of the splice in the high, medium, and light tension belt applications. The disclosed method of has the following benefits: a conventional bias is eliminated, consequently reducing the splice length and time required for splicing the belting; the load exerted on the splice will be symmetrically distributed about the centerline of the splice; the static strength of the splice is not compromised.

SUMMARY OF THE INVENTION

The present invention is directed toward an improved method of splicing belting. The improved method comprises preparing an end of a belt for splicing. The belt has at least two reinforcing layers and is to be spliced along spaced transverse edges of the ends of the reinforcement layers. The method is characterized by preparing the transverse edge of one of the reinforcing layers in a first defined geometric configuration and preparing the transverse edge of the second reinforcing layer in a second defined geometric configuration. The second defined geometry differs from the first geometric configuration.

In another aspect of the disclosed invention, the transverse edges of the reinforcement layers are prepared with configurations selection from the group of geometric configurations of a straight line, chevron, arc-shaped, parabolic, semi-circular, wave-like line, or an undulating line.

In another aspect of the invention, the belt to be spliced may have three reinforcing layers. The transverse edge of the third reinforcing layer may be prepared in either the first or second defined geometric configuration. Or if desired, the edge of the third layer may be prepared in a third defined geometric configuration.

In another aspect of the invention, the belt to be spliced may have four reinforcing layers. The edges of the third reinforcing layer are prepared in a defined third geometric configuration, and the edges of the fourth reinforcing layer are prepared in a fourth defined geometric configuration. The third and fourth configurations may be identical or different than the first and second defined configurations.

In another aspect of the invention, for any belt with three or more reinforcing layers, the outermost reinforcing layers have transverse edges prepared in a straight, non-bias configuration. The innermost reinforcing layers are prepared in a non-straight defined geometric configuration.

BRIEF DESCRIPTION OF THE DRAWINGS

The invention will be described by way of example and with reference to the accompanying drawings in which:

FIG. 4A is an overhead view of a belt spliced in a conventional method;

FIG. 4B is an overhead view of one embodiment of a belt spliced in accordance with the inventive splicing preparation method;

FIG. 4C is an overhead view of another embodiment of a belt spliced in accordance with the inventive splicing preparation method.

DETAILED DESCRIPTION OF THE PREFERRED EMBODIMENTS

Figure 1:
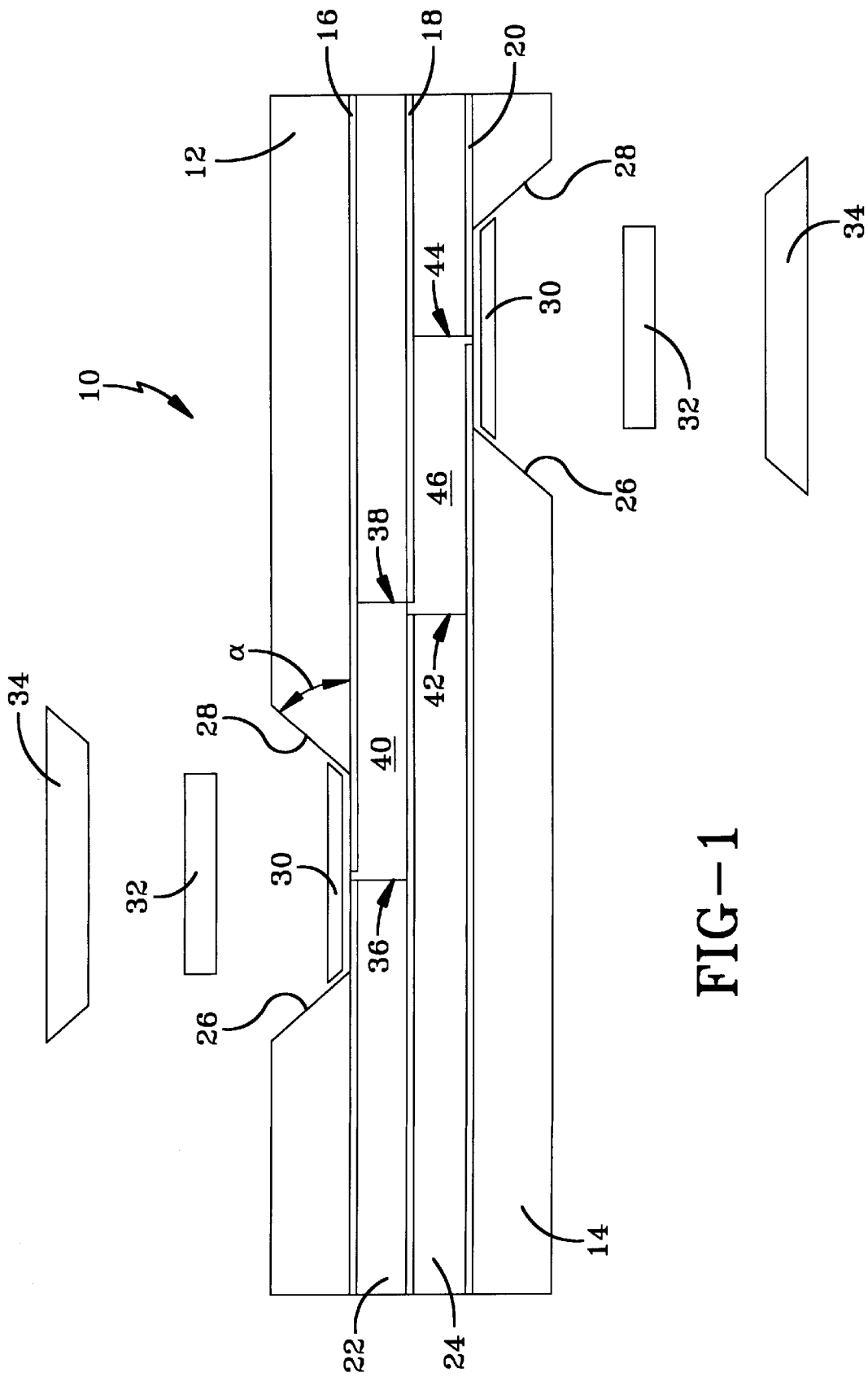
FIG. 1 is a side view of a belt in preparation for splicing.

FIG. 1 illustrates a multi-layered belt 10 spliced in accordance with an embodiment of the present invention. The belt 10 is comprised of a top cover layer 12, a bottom cover layer 14, three intermediate reinforcement layers, 16, 18, 20 and two intermediate elastomeric layers 22, 24. The top and bottom cover layers 12, 14 are preferably elastomeric. The elastomeric composition of the cover layers 12, 14 may be similar or dissimilar to that of the intermediate layers 22, 24. The elastomers may be of any conventional elastomeric compositions typically used in belts; one skilled in the art would readily appreciate the composition selection is dependant upon the intended use of the belting. The reinforcement layers 16, 18, 20 may be of identical construction or may vary depending upon the desired characteristics required of the belt; for example, the intermediate reinforcement layer 18 may be defined by predominately longitudinally extending reinforcing cords while the outer layers 16, 20 may be predominately defined by horizontally extending reinforcing cords. The primary reinforcing material may be selected from any of the conventional belt reinforcing cords such as steel, aramid, polyester, nylon, glass, or any combination of these materials.

In preparing a belt end for splicing, the splice regions of the top and bottom cover layers 12, 14 are prepared in an identical manner, so the description of the splice preparation and splice will be made with reference to the top cover layer 12 is also applicable to the bottom cover layer 14. The leading and trailing edges of the cover layer 12 are cut at an angle a of approximately 45° relative to the surface of the belt 10. Placed between the leading and trailing edges 26, 28 is a strip of repair gum 30, a protecting breaker 32, and a new cover strip 34. The repair gum 30 and cover strip 34 may have the edges beveled to mate with the inclined edges 26, 28 of the cover layer 12. The thickness of the repair gum 30, the protecting breaker 32 and the cover strip 34 is sufficient so that after vulcanization occurs, the top of the cover strip 34 is flush with the top surface of the belt 10.

Centrally located within the top cover layer splice region is the first edge 36 of the first intermediate splice region. The first edge 36 corresponds to the end of the first reinforcing layer 16 and the adjacent elastomeric layer 22. The second edge 38 of the splice region is distanced from the edge of the cover layer splice region. The second edge 38 corresponds to the opposing end of the elastomeric layer 22. Reinforcing layer 16 is stripped of any adjacent intermediate elastomeric layer between the edges 36, 38 of the intermediate splice region. Between the edges 36, 38 of the splice, and adjacent to the reinforcing layer 16, is a gum strip insert 40. The gum strip 40 may be cord reinforced.

The second edge 38 of the first intermediate splice region just overlaps the first edge 42 of the second intermediate splice region. The first edge 42 corresponds to the end of the second reinforcing layer 18 and the adjacent elastomeric layer 24. The second edge 44 of the splice region is centrally located within the bottom cover layer splice region. The second edge 44 corresponds to the opposing end of the elastomeric layer 24. Similar to layer 16, reinforcing layer 18 is stripped on one side of any adjacent intermediate elastomeric layer between the edges 42, 44 of the second intermediate splice region. Between the splice edges 42, 44 is a gum strip insert 46; the gum strip 46 may be cord reinforced.

The second edge 44 of the second intermediate splice also corresponds to the end of the third reinforcing layer 20. Since the adjacent rubber is stripped from the reinforcing layer 18 for placement of the gum insert 46, the rubber is correspondingly stripped from layer 20.

Figure 2:
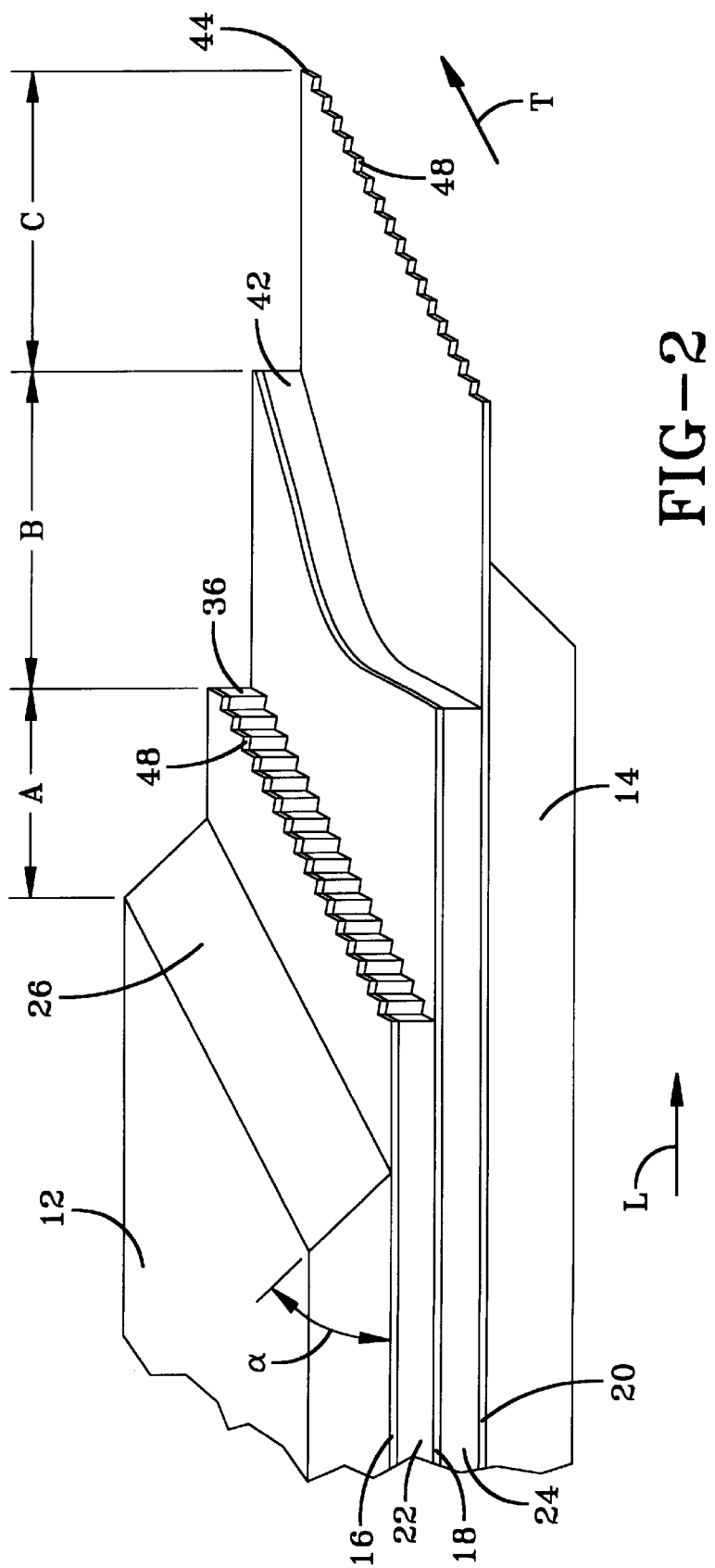
FIG. 2 is a perspective view of a belt end prepared for splicing.
Figure 3:
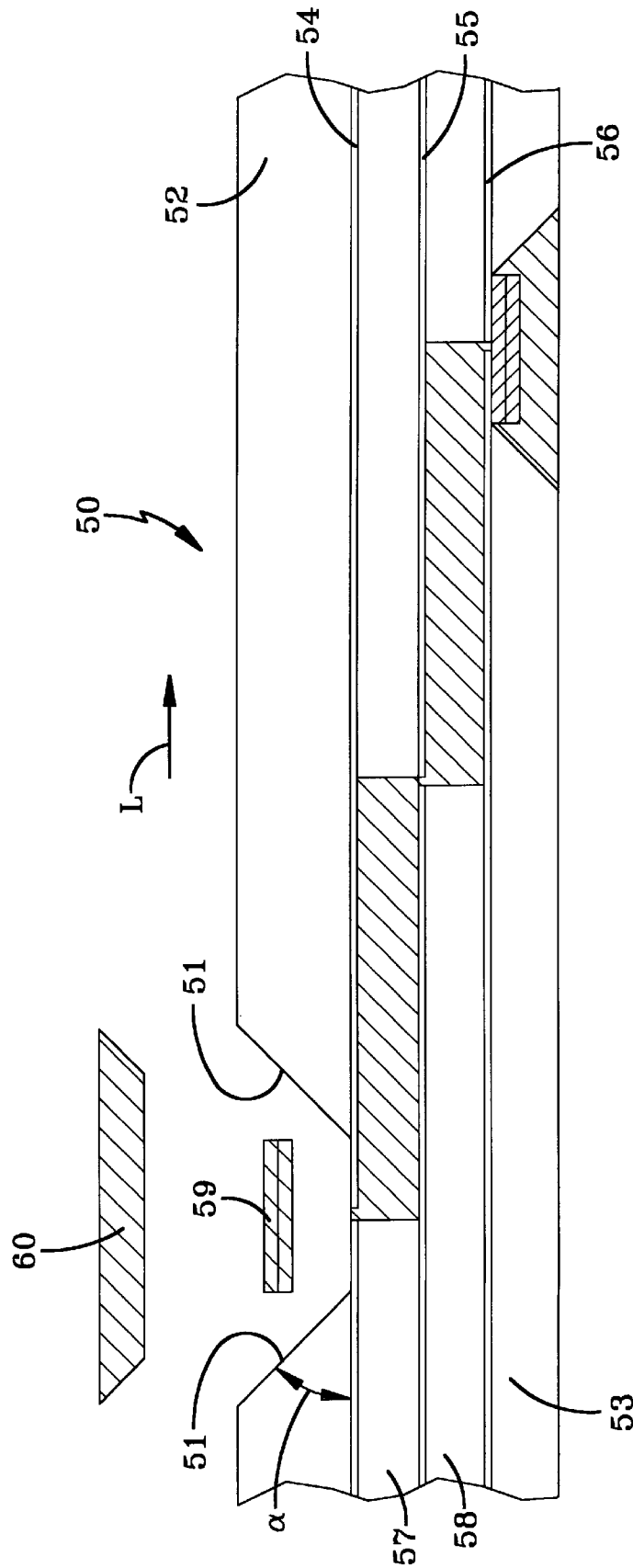
FIG. 3 is a side view of a conventional belt splice.
Figure 5A:
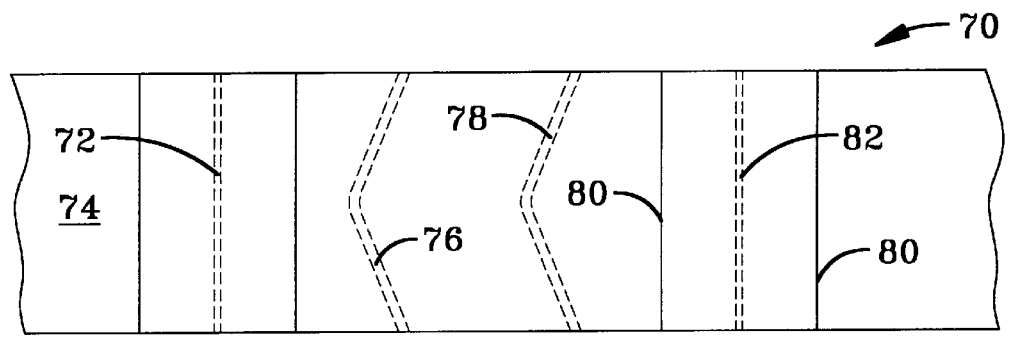
FIGS. 5A–5D are overhead views of embodiments of a four-layer belt spliced in accordance with the inventive splicing preparation method.
Figure 5B:
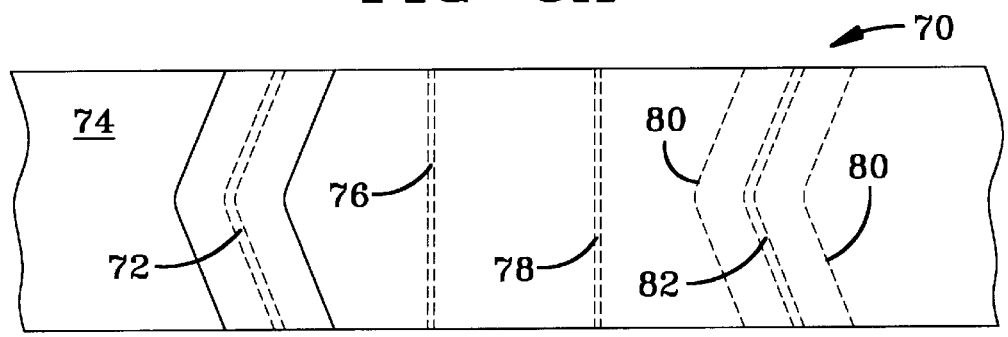
Figure 5C:
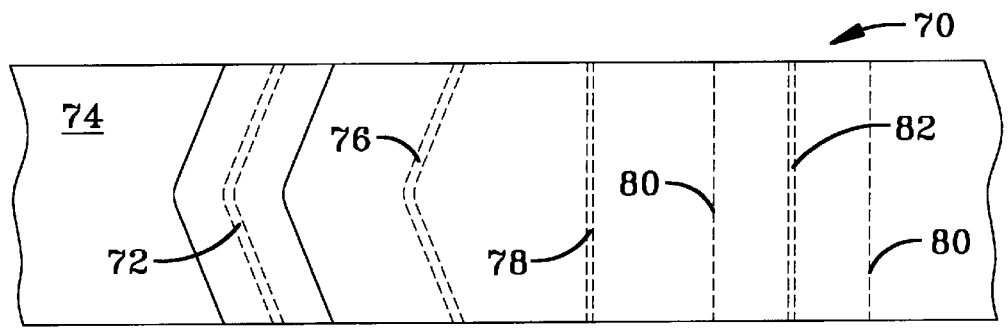
Figure 5D:
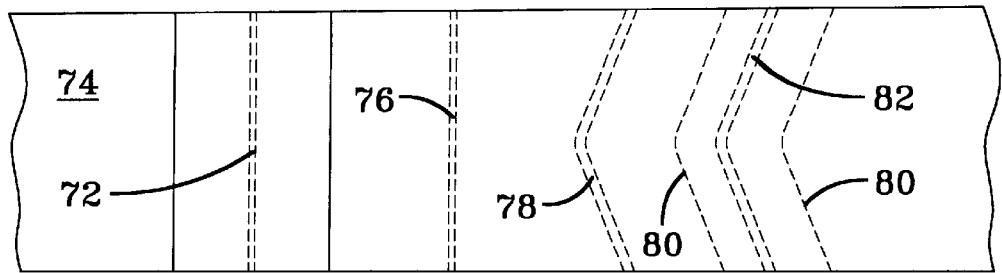

FIG. 2 illustrates one belt end prepared for splicing, it being understood that the other end of the conveyor belt is prepared in an identical manner but with the order of the layers being reversed and prepared in a mirror image. As seen in FIG. 2, the edge 26 of the top cover layer 12 is cut at an angle a of approximately 45°, relative to the surface, and longitudinal direction L, of the belt 10. The cut edge 26 extends at a 90° angle relative to the longitudinal direction L of the belt 10; that is, the cut edge 26 is a non-bias edge relative to the transverse direction T of the belt 10. The geometric configuration of the edge 26 is a straight line parallel to the transverse direction T of the belt 10.

Distanced from the prepared edge 26 of the top cover layer 12 by a length A is the first edge 36 of the first intermediate splice region. The first edge 36 extends through the first reinforcing layer 16 and the associated intermediate rubber layer 22. The first edge 36 is prepared in a first geometric configuration. The illustrated geometric configuration of the edge 36 is a straight line parallel to the transverse direction T of the belt 10. The edge 36 is provided with fingers 48 for interlocking with the new inside gum portion 40.

Distanced from the first edge 36 of the first intermediate splice region by a length B is the first edge 42 of the second intermediate splice region, extending through the second reinforcing layer 18 and the associated intermediate rubber layer 24. The edge 42 is prepared in a second geometric configuration which differs from the first geometric configuration defining edge 36. The illustrated geometric configuration of the edge 42 is a chevron. When the geometric configuration, such as the illustrated chevron, is not a straight non-bias line, the length B is determined at the belt edges. The chevron edge 42 is not illustrated with interlocking fingers 48; however, the edge 42 may be provided with such if desired.

Distanced from the first edge 42 of the second intermediate splice region by a length C is the prepared edge 44 of the third reinforcing layer 20. The illustrated geometric configuration of the edge 44 is a straight line parallel to the transverse direction T of the belt 10. The edge 44 is provided with fingers 48 for interlocking with the second prepared edge of the reinforcing layer 20.

For the inventive splice configuration, the use of multiple geometric configurations permits a faster splice when the belt is repaired or spliced in the field. It has been determined in testing splice regions that employing a simpler splice configuration for the intermediate layers is possible without compromising the belt characteristics and may provide better belt characteristics as further discussed herein. This has led to the splicing method disclosed by the present invention, the use of multiple geometric configurations in a single belt splice.

The inventive splice configuration, employing generally non-bias cuts in each splice region, as opposed to the conventional multiple bias splice lines, yields an overall splice length S which may be shorter than the conventional splice length $S_C$, as seen illustrated in FIGS. 4A–4B. In the prior art splicing method, the splice length for a belt 50 having three reinforcing layers 54, 55, 56 is $S_C$. The total splice length for each belting 10, 50 illustrated in FIGS. 4A–4C is the greatest longitudinal length of the belting 10, 50 which includes a splice point. For the conventionally spliced belt 50, of FIG. 4A, the cover strip 60 applied also has a longitudinal length of X.

In the belting 10 spliced in accordance with the present invention, the overall splice length S may be equal or less than the conventional splice length $S_C$. If the length D' of the cover strip 34 is approximately equal to the length X of the cover strip 60 for conventional splicing, see FIG. 4B, the overall splice length S for the inventive splicing method is less than the conventional splice length $S_C$. Conversely, as illustrated in FIG. 4C, if the length D" of the cover strip 34 is greater than the conventional cover strip length X, than the overall splice length S increases and may approach or equal that of the splice length $S_C$ of the conventional method.

The inventive method can be viewed in several possible lights. The use of non-bias splice lines with multiple geometries permits a shorter overall splice length S. Alternatively, the use of non-bias splice lines permits the use of longer cover strips. The use of cover strips with a length D greater than the conventional length provides for improved transfer of tensile force through the splice region of the belt. A conveyor belt spliced in accordance with the present invention has a lower tensile loss than conventionally experienced.

FIGS. 4B and 4C also more clearly show the chevron configuration. The chevron is defined by a radius centerpoint and two inclined leg portions. The centerpoint of the chevron has a radius of 5" to 18" (12.7 cm to 45.75 cm), preferably 6" to 7" (15.25 cm to 17.75 cm). The leg portions are inclined at angles φ of 80° to 45°, preferably 78° to 70°. While the centermost splice is illustrated and described above as having a chevron configuration, other possible configurations are permissible which do not length the overall splice length. The splice may be arc-shaped, parabolic, semi-circular. The splice may also be wave-like or undulating.

While all of the illustrated embodiments of a three-ply belt show the more complex second geometrical configuration for the splice as being the innermost splice, it is possible for the outermost splice to be configured with the more complex geometry. When employing the more complex geometry for an outermost reinforcing layer splice, that is, a splice in a reinforcing layer directly adjacent to the top or bottom cover layer 12, 14, the geometrical configuration for the splice of the top or bottom cover layer should mimic that of the splice in the adjacent reinforcing layer.

The present invention may be practiced with any multiple ply belting. For two-ply belting, one layer may be cut at a straight line, parallel to the transverse belt direction while the second layer is cut with a second geometrical configuration.

For four-ply belting, or any other belting comprising more than two reinforcing layers, the splice geometries may be divided in any desired manner, so long as at least two different geometries are employed in preparing the ends of the reinforcing layers. Examples of different lay-ups for splice geometries in four ply beltings 70 are illustrated in FIGS. 5A–5D. In each of the illustrated beltings 70, the configuration of the first splice 72 corresponds to the splice configuration for the cover layer 74. The innermost splice configurations 76, 78 may be any identical or may differ. As the cover layer splice configuration corresponds to the first splice 72, the splice lines 80 for the bottom cover layer splice follow correspond to the last splice 82. Though not illustrated, the geometric configurations can also be alternated: straight, chevron, straight, and chevron. When employing two different geometrical configurations, the number of possible configurations is mathematically based upon the number of reinforcing layers in the belt. Additionally, when splicing a belt with three or more reinforcing layers, the end of the third reinforcing layer may be prepared in a third geometrical configuration which differs from the geometrical configuration of the ends of the other reinforcing layers. The number of geometrical configurations employed in splicing the belt is equivalent to the number of reinforcing layers in the belting.

For multiple plies, including the illustrated three and four plies, it is preferred that the splice line of the two outermost reinforcing plies, those adjacent to the top and bottom cover layers, be straight parallel cuts of the type described herein while the splice line of the innermost plies have a different geometry such as the illustrated chevron.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved method of preparing an end of a belt, having at least two reinforcing layers, for splicing along at least two spaced transverse edges forming the respective ends of the reinforcement layers, the method being characterized by:

preparing the end of one of the at least two reinforcing layers in a first defined geometric configuration and preparing the end of the second of the at least two reinforcing layers in a second defined geometric configuration differing from the first geometric configuration.

2. An improved method of preparing an end of a belt in accordance with claim 1 wherein the geometric configurations are selected from among the group consisting of a straight line, chevron, arc-shaped, parabolic, semi-circular, wavelike line, and an undulating line.

3. An improved method of preparing an end of a belt in accordance with claim 1 wherein the belt is comprised of three reinforcing layers and the improved method is further characterized by preparing the end of the third reinforcing layer in a geometric configuration corresponding to the first or second defined geometric configurations.

4. An improved method of preparing an end of a belt in accordance with claim 1 wherein the belt is comprised of three reinforcing layers and the improved method is further characterized by preparing the end of the third reinforcing layer in a defined geometric configuration which differs from the first and second defined geometric configuration.

5. An improved method of preparing an end of a belt in accordance with claim 1 wherein the belt is comprised of four reinforcing layers and the improved method is further characterized by preparing the end of the third reinforcing layer in a third defined geometric configuration and preparing the end of the fourth reinforcing layer in the a defined fourth geometric configuration, the geometric configurations of the ends of the third and fourth reinforcing layers corresponding to the first or second defined geometric configurations.

6. An improved method of preparing an end of a belt in accordance with claim 1 wherein the belt is comprised of four reinforcing layers and the improved method is further characterized by preparing the end of the third reinforcing layer in a third defined geometric configuration and preparing the end of the fourth reinforcing layer in the a defined fourth geometric configuration, wherein the third and fourth defined geometric configurations differ from the first and second defined geometric configurations.

7. An improved method of preparing an end of a belt in accordance with claim 1 wherein the first geometric configuration has an overall configuration parallel to the transverse direction of the belt.

8. An improved method of preparing an end of a belt in accordance with claim 1 wherein the belt is comprised of at least three reinforcing layers, a top cover layer, and a bottom cover layer, the reinforcing layers adjacent to the top and bottom cover layers being the outer reinforcing layers and the remaining reinforcing layers being the inner reinforcing layers, the improved method being further characterized by preparing the ends of the outer reinforcing layers in a first defined geometric configuration and preparing the end of the inner reinforcing layers in a second defined geometric configuration.

9. An improved method of preparing an end of a belt in accordance with either claim 1 or 8 wherein the first geometric configuration is a non-bias line, parallel to the transverse direction of the belt end.

* * * * *